US011449268B2

(12) United States Patent
Kachare et al.

(10) Patent No.: US 11,449,268 B2
(45) Date of Patent: Sep. 20, 2022

(54) DEEP SOLID STATE DEVICE (DEEP-SSD): A NEURAL NETWORK BASED PERSISTENT DATA STORAGE

(71) Applicant: Samsung Electronics Co., Ltd., Suwon-si (KR)

(72) Inventors: Ramdas P. Kachare, Pleasanton, CA (US); Manali Sharma, Santa Clara, CA (US)

(73) Assignee: SAMSUNG ELECTRONICS CO., LTD.

( * ) Notice: Subject to any disclaimer, the term of this patent is extended or adjusted under 35 U.S.C. 154(b) by 44 days.

(21) Appl. No.: 16/430,408

(22) Filed: Jun. 3, 2019

(65) Prior Publication Data

US 2020/0159445 A1 May 21, 2020

Related U.S. Application Data

(60) Provisional application No. 62/770,151, filed on Nov. 20, 2018.

(51) Int. Cl.
*G06F 3/06* (2006.01)
*G06N 3/08* (2006.01)

(52) U.S. Cl.
CPC .......... *G06F 3/0655* (2013.01); *G06F 3/0604* (2013.01); *G06F 3/0679* (2013.01); *G06N 3/08* (2013.01)

(58) Field of Classification Search
CPC .... G06F 3/0655; G06F 3/0604; G06F 3/0679; G06N 3/08
See application file for complete search history.

(56) References Cited

U.S. PATENT DOCUMENTS

| | | | |
|---|---|---|---|
| 5,504,884 A | 4/1996 | Kyuma et al. | |
| 6,879,266 B1* | 4/2005 | Dye | G06F 12/08 |
| | | | 341/51 |
| 8,965,819 B2 | 2/2015 | Tirunagari | |
| 9,461,972 B1* | 10/2016 | Mehta | H04L 63/10 |
| 9,727,459 B2 | 8/2017 | Khoueir et al. | |
| 10,169,387 B1* | 1/2019 | Zhao | H03M 7/30 |
| 10,203,897 B1* | 2/2019 | Cheah | G06F 3/0638 |
| 10,229,356 B1* | 3/2019 | Liu | G06N 3/084 |
| 10,235,064 B1* | 3/2019 | Natanzon | G06F 3/0619 |
| 10,614,038 B1* | 4/2020 | Armangau | G06F 16/1752 |
| 10,671,703 B1* | 6/2020 | McNair | G16H 10/60 |
| 2005/0259876 A1* | 11/2005 | Ogawa | H04N 19/30 |
| | | | 382/232 |

(Continued)

*Primary Examiner* — Prasith Thammavong
(74) *Attorney, Agent, or Firm* — Renaissance IP Law Group LLP

(57) ABSTRACT

According to one general aspect, an apparatus may include a host interface circuit configured to receive a memory access request, wherein the memory access request is associated with a data set. The apparatus may include a non-volatile memory storage circuit configured to create and store a transformed data set. The apparatus may include a translation circuit comprising at least one machine learning circuit. The translation circuit may be configured to: in response to a write memory access, convert an original version of the data set to the transformed data set, and in response to a read memory access, convert the transformed data set to a reconstructed data set.

21 Claims, 6 Drawing Sheets

(56) References Cited

U.S. PATENT DOCUMENTS

| | | | | |
|---|---|---|---|---|
| 2006/0193470 A1* | 8/2006 | Williams | H04L 9/0894 | 380/259 |
| 2009/0164789 A1* | 6/2009 | Carvounas | G06F 21/445 | 713/176 |
| 2010/0074322 A1* | 3/2010 | Terashima | H04N 19/428 | 375/240.01 |
| 2010/0128521 A1* | 5/2010 | Mizuguchi | G11C 16/08 | 365/185.02 |
| 2010/0135082 A1* | 6/2010 | Bathul | G11C 16/3454 | 365/185.19 |
| 2010/0142284 A1* | 6/2010 | Bathul | G11C 11/5628 | 365/185.19 |
| 2010/0274926 A1* | 10/2010 | Marulkar | H03M 7/30 | 709/247 |
| 2010/0318718 A1* | 12/2010 | Eilert | G06F 3/0688 | 711/103 |
| 2010/0329548 A1* | 12/2010 | Yoshimura | H04N 19/103 | 382/164 |
| 2013/0250062 A1* | 9/2013 | Tin | G06T 7/85 | 348/46 |
| 2013/0254787 A1* | 9/2013 | Cox | H04N 21/4661 | 725/13 |
| 2015/0104152 A1* | 4/2015 | Reinhardt | G06F 3/165 | 386/243 |
| 2016/0219794 A1* | 8/2016 | Greenberg | H05B 45/20 | |
| 2016/0232440 A1* | 8/2016 | Gregor | G06N 3/04 | |
| 2016/0247080 A1 | 8/2016 | Trantham et al. | | |
| 2018/0074723 A1* | 3/2018 | Delaney | G06F 3/0608 | |
| 2018/0184041 A1* | 6/2018 | Kunieda | H04N 5/243 | |
| 2018/0261071 A1* | 9/2018 | Cao | G08B 13/19613 | |
| 2018/0314985 A1* | 11/2018 | O'Shea | G06N 3/0454 | |
| 2019/0042401 A1* | 2/2019 | Khan | G06F 3/0683 | |
| 2019/0244230 A1* | 8/2019 | Subramanian | G06N 7/005 | |
| 2019/0392300 A1* | 12/2019 | Weber | G06N 3/082 | |
| 2020/0104677 A1* | 4/2020 | Rae | G06F 16/2272 | |
| 2020/0117539 A1* | 4/2020 | Sun | H04L 1/0057 | |
| 2021/0110244 A1* | 4/2021 | Hoang | G06F 17/16 | |
| 2021/0232893 A1* | 7/2021 | Bayat | G06F 3/0688 | |
| 2021/0397931 A1* | 12/2021 | Hoang | G06F 3/0659 | |

\* cited by examiner

DEEP SOLID STATE DEVICE (DEEP-SSD): A NEURAL NETWORK BASED PERSISTENT DATA STORAGE

CROSS-REFERENCE TO RELATED APPLICATION

This application claims priority under 35 U.S.C. § 119 to Provisional Patent Application Ser. No. 62/770,151, entitled "NN BASED PERSISTENT DATA STORAGE" filed on Nov. 20, 2018. The subject matter of this earlier filed application is hereby incorporated by reference.

TECHNICAL FIELD

This description relates to the storing of data, and more specifically to neural network based persistent data storage.

BACKGROUND

In modern Information Technology (IT) infrastructure, very large amounts of data are being generated by various devices and processes. Some examples of these data generators are smart machines, autonomous vehicles, social networks, and Internet-of-things (IOT) devices. New artificial intelligence (AI) and machine learning (ML) techniques are being developed to effectively analyze the collected data and use it to achieve even greater efficiency and productivity of applications. Such humongous quantities of data are stored in high performance, reliable storage systems consisting of solid-state devices (SSDs), hard disk drives (HDDs), storage nodes, and storage interconnects.

Artificial neural networks (NN) or connectionist systems are computing systems vaguely inspired by the biological neural networks that constitute animal brains. The neural network is a framework for many different machine learning techniques to work together and process complex data inputs. Such systems "learn" to perform tasks by considering examples, generally without being programmed with any task-specific rules. For example, in image recognition, they might learn to identify images that contain cats by analyzing example images that have been manually labeled as "cat" or "no cat" and using the results to identify cats in other images. They do this without any prior knowledge about cats, for example, that they have fur, tails, whiskers and cat-like faces. Instead, they automatically generate identifying characteristics from the learning material that they process.

A NN is based on a collection of connected units or nodes called artificial neurons, which loosely model the neurons in a biological brain. Each connection, like the synapses in a biological brain, can transmit a signal from one artificial neuron to another. An artificial neuron that receives a signal can process it and then signal additional artificial neurons connected to it. In common NN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

SUMMARY

According to one general aspect, an apparatus may include a host interface circuit configured to receive a memory access request, wherein the memory access request is associated with a data set. The apparatus may include a non-volatile memory storage circuit configured to store a transformed data set. The apparatus may include a translation circuit comprising at least one machine learning circuit. The translation circuit may be configured to: in response to a write memory access, convert an original version of the data set to the transformed data set, and in response to a read memory access, convert the transformed data set to a reconstructed data set.

According to another general aspect, a system may include a host computing device configured to perform a memory access with a storage device, wherein the memory access requests are associated with a data set. The system may include the storage device. The storage device may include a memory storage circuit configured to store a transformed data set. The storage device may include a translation circuit comprising at least one machine learning circuit. The translation circuit may be configured to, in response to the memory access, either: convert an original version of the data set to the transformed data set, convert the transformed data set to a reconstructed data set, or return the transformed data set.

According to another general aspect, a method may include receiving an original data set to store in a memory circuit. The method may include converting the original data set, via a machine learning technique, include a transformed data set, wherein the transformed data set is smaller than the original data set. The method may include storing the transformed data set instead of the original data set.

The details of one or more implementations are set forth in the accompanying drawings and the description below. Other features will be apparent from the description and drawings, and from the claims.

A system and/or method for the storing of data, and more specifically to neural network based persistent data storage, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1A:
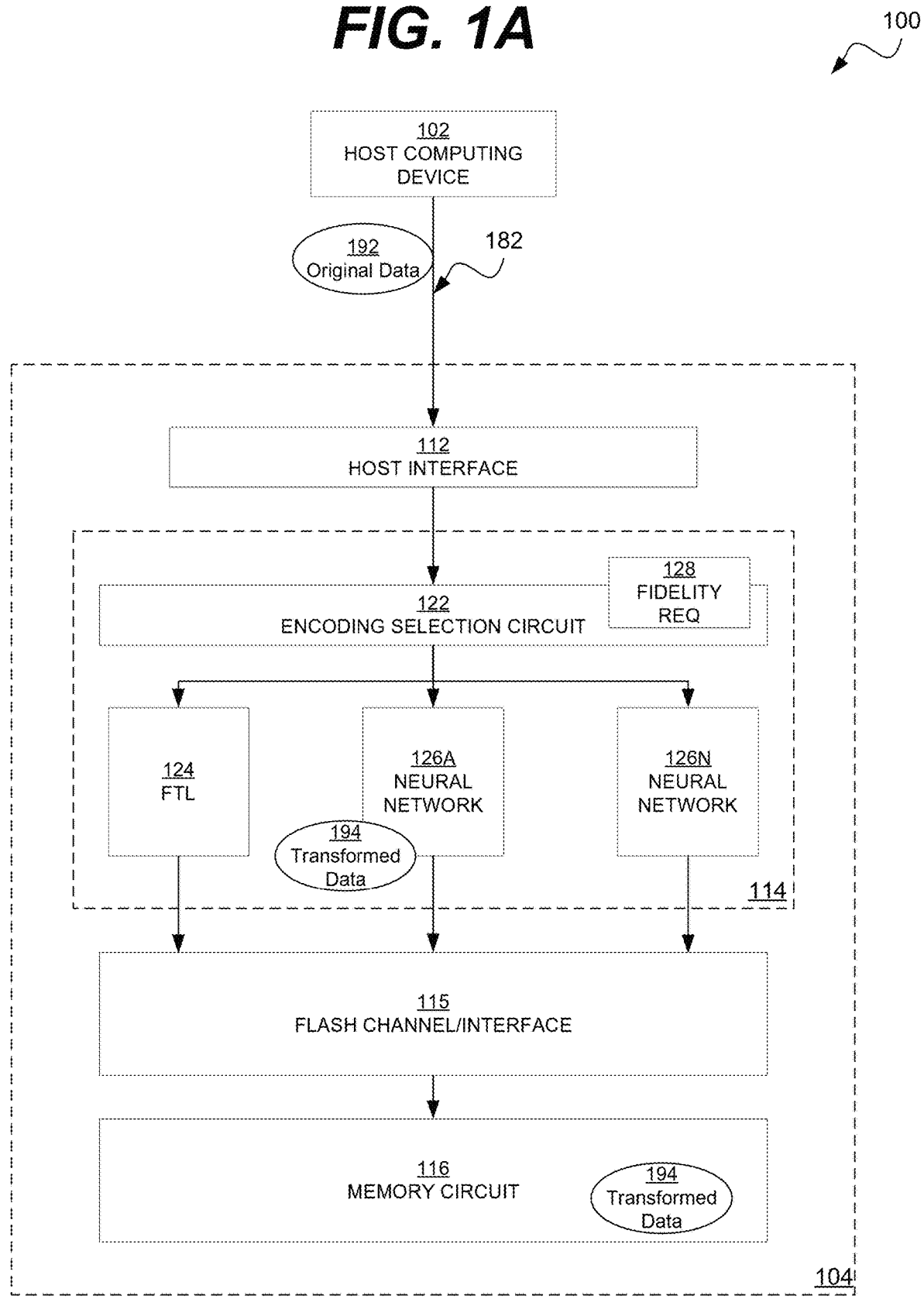
FIG. 1A is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1A is a block diagram of an example embodiment of a system 100 in accordance with the disclosed subject matter. In various embodiments, the system 100 may be employed to store a large amount of data, as described above. In the illustrated embodiment, a write memory access is illustrated.

In the illustrated embodiment, the system 100 may include a host computing device 102. In some embodiments, the host computing device 102 may include various computing devices, such as, for example, a laptop, desktop, workstation, personal digital assistant, smartphone, tablet, and other appropriate computers or a virtual machine or virtual computing device thereof. In various embodiments, the user device 102 may be used by a user (not shown). In some embodiments, the host computing device 102 may be a plurality of devices each reading and writing data from/to the storage device 104.

In the illustrated embodiment, the system 100 may include a storage device 104. In various embodiments, the storage device 104 may be configured to store data. Again, in various embodiments, the system 100 may include a plurality of storage devices 104, even though only one is shown in the figure. In various embodiments, the storage device 104 may include a solid-state device (SSD), a ferromagnetic hard disk drive (HDD) or any other storage technology, whether volatile or non-volatile.

Traditionally, a storage device is configured to accurately store the data written to it. When one writes data to a storage device, one expects to later extract the exact same data. In the illustrated embodiment, the storage device 104 may not be configured to do that. Instead, the storage device 104 may be configured to store, and later produce, a representation of the original data. In various embodiments, this representation may be or be equal to the original data, or may not be equal to the original data. In such an embodiment, the system 100 may be configured to provide both or either of lossless and lossy storage.

In the illustrated embodiment, the host computing device 102 may issue a write memory access 182. The write memory access 182 may include an original data set 192 to be stored by the storage device 104.

In the illustrated embodiment, the storage device 104 may include a host interface circuit 112. In such an embodiment, the host interface circuit 112 may be configured to receive a memory access request (e.g., request 182). In some embodiments, the host interface circuit 112 or layer (HIL) may handle the logical view of the storage 116. In such an embodiment, the host 102 may use a logical address range to access the storage capacity of the storage device 104. In various embodiments, the host interface circuit 112 may be configured to translate between the logical protocol used by the host 102 and the internal actual physical protocol or mechanism used by the storage device 104. In various embodiments, a flash channel or interface circuit 115 may perform logical address to physical address translation. In some embodiments, the storage device 104 may not use a traditional physical addressing scheme, as described below.

In the illustrated embodiment, the storage device 104 may include a translation circuit 114. In various embodiments, the translation circuit 114 may be configured to convert the original data set 192 to a transformed data set 194. In various embodiments, the transformed data set 194 may be smaller than the original data set 192. In such an embodiment, the storage device 104 may be configured to store a reduced representation of the original data set 192, instead of the original itself.

In various embodiments, the reduced representation along with the state of the neural network (NN) may be used to recreate or reconstruct the original data when needed. The recreation or reconstruction of the data may or may not exactly match the original data in terms of the size of the original data and/or the values of the original data. In such an embodiment, the amount of space needed to store the data may be reduced. As described above, in various embodiments, the transformed data set 194 may be created using a lossless or lossy reduction scheme. When the reconstruction accuracy, also called as fidelity, is less than 100%, the persistent storage is said to be lossy. When the reconstruction accuracy is 100%, the persistent storage is lossless.

The amount of actual persistent storage media such as NAND flash used is the size of the reduced representation and the amount of storage media needed to store the state of the neural networks used. The amount of storage needed for neural networks depends upon the number of layers and number of nodes in each of the network. For example, for a two layer fully-connected neural network with 128 nodes in each layer, the number of parameters that need to be stored for this neural network would be 128×128, and a bias parameter for each layer. In this example, for simplicity, we assume that we do not store the bias parameters. Assuming that each parameter requires 64 bits, the total storage for this two layer neural network would be (128×128×8)/1024=128 KB. Assuming two networks are used in the storage device, NAND flash capacity needed to store the state of the networks would be 256 KB. This storage would be amortized over all the user data stored in such storage device. That is to say that this storage amount would be fixed and independent of the actual user data. Further assuming every 4 KB original data could be reduced to 8 bytes for storage, that would represent 512 times the reduction in storage capacity needed. In other words, say the proposed storage device has 1 MB (1024 KB) NAND flash capacity. After subtracting the space needed for two neural networks (256 KB) as described above, the remaining capacity of (1024 KB−256 KB)=768 KB is available to persistently store the user data. Assuming 8 B reduced representation of 4 KB data, 768 KB space can be used to store (768 KB/8 B)=96 K datasets of 4 KB size each. In other words the storage device with 1 MB actual NAND flash media, can store (96 K×4)=384 MB user data.

In various embodiments, the translation circuit 114 may include one or more machine learning (ML) circuits 126. These ML circuits 126 may be configured to reduce the size of the original data set 192, and convert or translate the original data set 192 to the transformed data set 194. In one embodiment, the ML circuit 126 may implement a neural network (NN), although Bayesian networks, genetic techniques, principal component analysis, and/or support vector machines are contemplated. It is understood that the above are merely a few illustrative examples to which the disclosed subject matter is not limited.

In the illustrated embodiment, the translation circuit 114 may include not just one, but a plurality of ML circuits (e.g., neural network 126A and 126N). In various embodiments, the translation circuit 114, via the encoding selection circuit 122, may be configured to select one of the ML circuits 126 to perform the transformation based upon one or more factors. In such an embodiment, the use of multiple ML circuits 126 may allow the translation circuit 114 to dynamically select an ML circuit 126 that is best suited for the purpose of transforming the original data set 192 (based upon whatever criteria are desired; e.g., reconstruction fidelity). The encoding selection circuit may select the FTL 124 to store the data as-is, with 100% fidelity, without performing any transformation to the original data.

In the illustrated embodiment, a fidelity requirement 128 may be set that dictates how lossy the transformation between the original data set 192 and the data set that is reconstructed from the transformed data set 194 is. In such an embodiment, the translation circuit 114 may select a given ML circuit 126, based upon the data type or other factors, that produces the desired fidelity (or better). The fidelity requirement may be provided by the host for each data write operation. In another embodiment the fidelity requirement may be configured to a fixed value by the host for various storage parameters such as Namespace identifier, host identifier, LBA address ranges, NVM set identifier, NVMe submission queue identifier, Stream Identifier, Ethernet MAC Identifier, TCP/IP addresses and other transport/network parameters, and general parameters like date, and time etc.

In another embodiment, the selection of which ML circuit 126 or technique to employ may be chosen based upon one or more factors. In such an embodiment, these factors may include a data or file type, the source host 102, the size of the original data set 192, an amount of free space in the memory circuit 116, etc. It is understood that the above are merely a few illustrative examples to which the disclosed subject matter is not limited.

In various embodiments, these requirements 128 may be included in the memory access 182. In another embodiment, these requirements 128 may be set via a separate command, received by the host interface circuit 112 or other interface circuit (not shown). In yet another embodiment, the fidelity requirement may be decided by the storage device itself based on various storage parameters such as Namespace identifier, host identifier, LBA address ranges, NVM set identifier, NVMe submission queue identifier, Stream Identifier, Ethernet MAC Identifier, TCP/IP addresses and other transport/network parameters, and general parameters like date, and time etc.

In various embodiments, as described below in reference to FIG. 3, the translation circuit 114 may be congregated to dynamically alter the operation of the ML circuits or techniques 126 to adjust the output characteristics (e.g., fidelity). In such an embodiment, the output characteristics of a particular ML circuit 126 may be tunable.

In some embodiments, the translation circuit 114 may include a lossless ML circuit 126. In such an embodiment, the transformed data set 194 may be smaller or equal to the same size as the original data set 192.

In the illustrated embodiment, the translation circuit 114 may include direct translation circuit 124, traditional non-neural network based, that creates a version of the transformed data 194 that is the same or equal to the original data set 192. In the illustrated embodiment, the translation circuit 114 may include or make use of the flash translation layer (FTL) 124. In such an embodiment, the FTL circuit 124 may be configured to perform logical address to physical address translation and write the original data set 192 (as the transformed data set 194) directly in memory circuit 116. In such an embodiment, the translation circuit 114 may use the FTL 124 and one or more options amongst the ML circuits 126.

In the illustrated embodiment, the storage device 104 may include a memory circuit 116. In such an embodiment, the memory circuit 116 may be configured to store the transformed data set 194. In such an embodiment, once the transformed data set 194 is created, it may be stored in the memory circuit 116. The original data set 192 may be discarded, in whole or part. For example, if the memory access 182 used logical block addressing (LBA), the entirety of the original data set 192 may be discarded, and the storage device 104 may rely upon the ability to reconstruct the data set 196 from the transformed data set 194. In another embodiment, if the memory access 182 is employed a key-value (KV) pair, the value portion of the original data set 192 may be discarded, but the key portion may be retained. In such an embodiment, the key portion (which is usually much smaller than the value portion) may be retained as an index to the transformed data set 194 (which is now used as the value portion).

In various embodiments, the use of the transformed data set may be sufficient despite the lossy aspect. For example, in applications where fidelity and response time are both not very important, e.g., sensor data, IoT data, videos and images, etc. Another example may entail applications where fidelity is not important, but response time is important, e.g., web applications that require quick response from the system. In another embodiment, the tunability of the data storage may be desirable. Such as, for example, applications where fidelity is important, but response time is not important, e.g., applications to periodically monitor animal behavior in zoo. Or in another example, applications where both fidelity and response time are very important, e.g. banking sector, The storage device described herein that makes use of a translation circuit 114 to transform the original data set 192 to a reduced representation data set 194, and reconstruct the dataset 196 from data set 194 is referred to as the Deep Solid State Device (Deep-SSD). In this context, a Deep-SSD may include a type of persistent data storage device that implements one or more "functions" using neural networks or similar techniques that transform the original data to a reduced size representation and reconstruct the original data, or an approximation of the original data, from the reduced size representation when needed. The "function" may essentially employ input value(s), called as Deep-Key, which are basically a reduced representation of the original data maintained internal to the device, to produce an output that matches with the original data to a given degree. Deep-SSD can resort to function like a regular SSD, by storing the data "as-is". It is understood that the above are merely a few illustrative examples to which the disclosed subject matter is not limited.

Figure 1B:
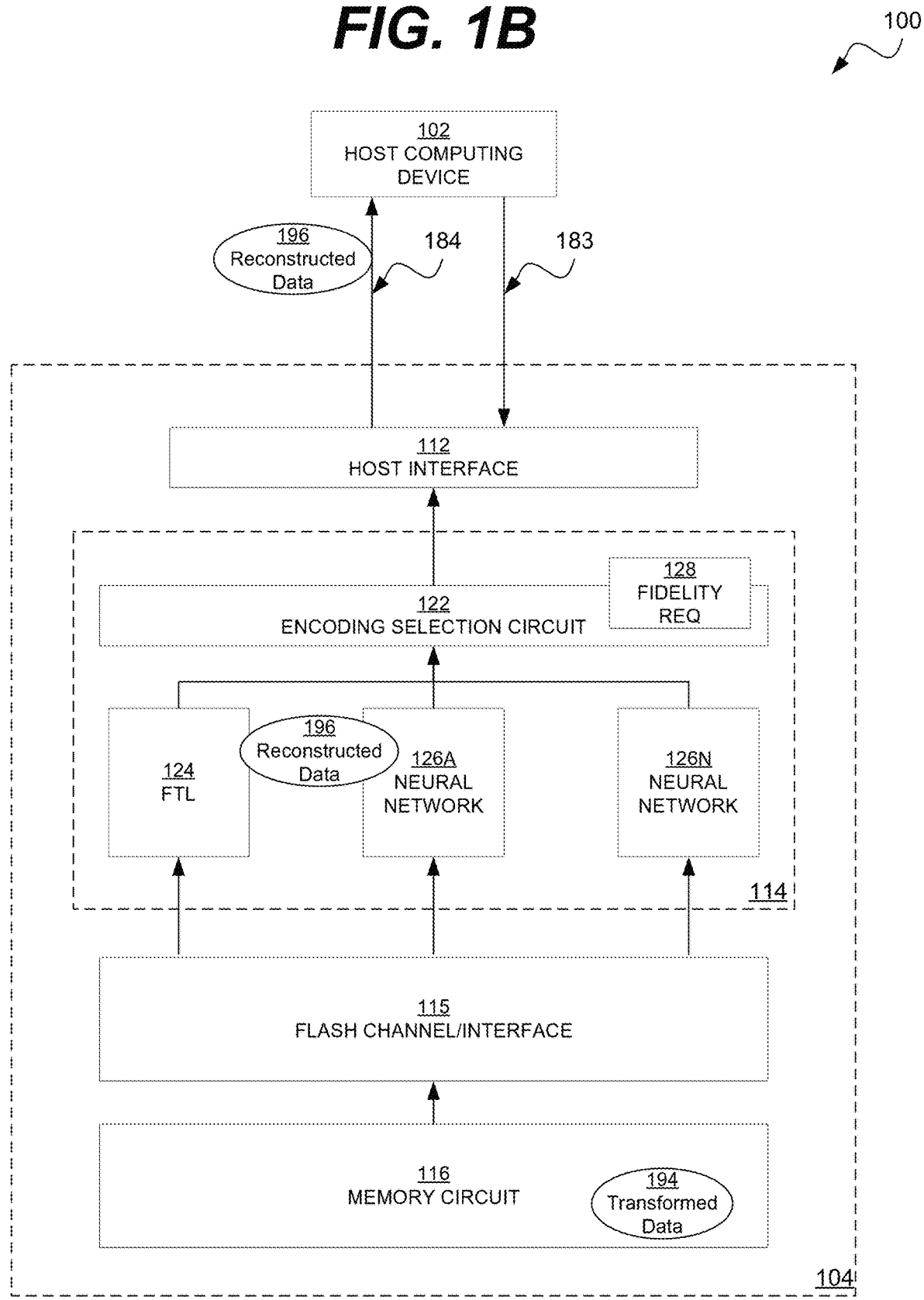
FIG. 1B is a block diagram of an example embodiment of a system in accordance with the disclosed subject matter.

FIG. 1B is a block diagram of an example embodiment of a system 100 in accordance with the disclosed subject matter. In various embodiments, the system 100 may be employed to store a large amount of data, as described above. In the illustrated embodiment, a read memory access is illustrated.

In the illustrated embodiment, the system 100 may again include the host computing device 102 and the storage device 104. In such an embodiment, the storage device 104 may include the host interface circuit 112, the translation circuit 114, and the memory circuit 116.

In the illustrated embodiment, the translation circuit 114 may include one or more ML circuits 126, configured to decode or recreate the original data set (or a facsimile or likeness thereof), known as the reconstructed data set 196. In various embodiments, in which a plurality of ML circuits 126 (e.g., NNs 126A and 126N) and/or the FTL 124 are included, the translation circuit 114 may include an encoding (or decoding) selection circuit 122.

In the illustrated embodiment, the host computing device 102 may issue a read memory access or request 183. The read request 183 may be associated with the original data set (shown in FIG. 1A). In such an embodiment, the read request 183 may include a logical address or a key (of a key-value pair) to indicate what data set is being requested.

In the illustrated embodiment, the storage device 104 may seek to fulfil the read request 183, but it may not have the requested original data set. Instead, it may have the transformed data set 194. In such an embodiment, the translation circuit 114 may run the transformed data set 194 through the ML circuit 126 used to create the transformed data set 194 in the first place (or an associate decoding ML circuit). In such an embodiment, the ML circuit 126 may create a reconstructed data set 196 from the transformed data set 194. Such a reconstructed data set 196 may be the storage device 104's best or chosen attempt at recreating the original data set.

In one embodiment, if the transformed data set 194 was a lossless encoding (or a direct copy via the FTL 124), the reconstructed data set 196 may be the same as the original data set. In another embodiment, if the transformed data set 194 was constructed using a lossy encoding, the reconstructed data set 196 may not be the same or equal to as the original data set. In such an embodiment, the system 100 may have set a fidelity requirement 128 where the reconstructed data set 196 need only be partially accurate (e.g., 90% accurate, 80% accurate, etc.).

In such an embodiment, once the reconstructed data set 196 is created, it may be sent back to the host computing device 102 (as read response 184). In various embodiments, the host interface circuit 112 may be configured to transmit this read response 184. In various embodiments, if the reconstructed data set 196 is lossy, it may be smaller than the original data set and therefore consume less bandwidth or other system resources in order to fulfil the read request 183. In another embodiment the reconstructed data may still match the exact size of the original data however the reconstructed content or values may not match exactly.

Figure 1C:
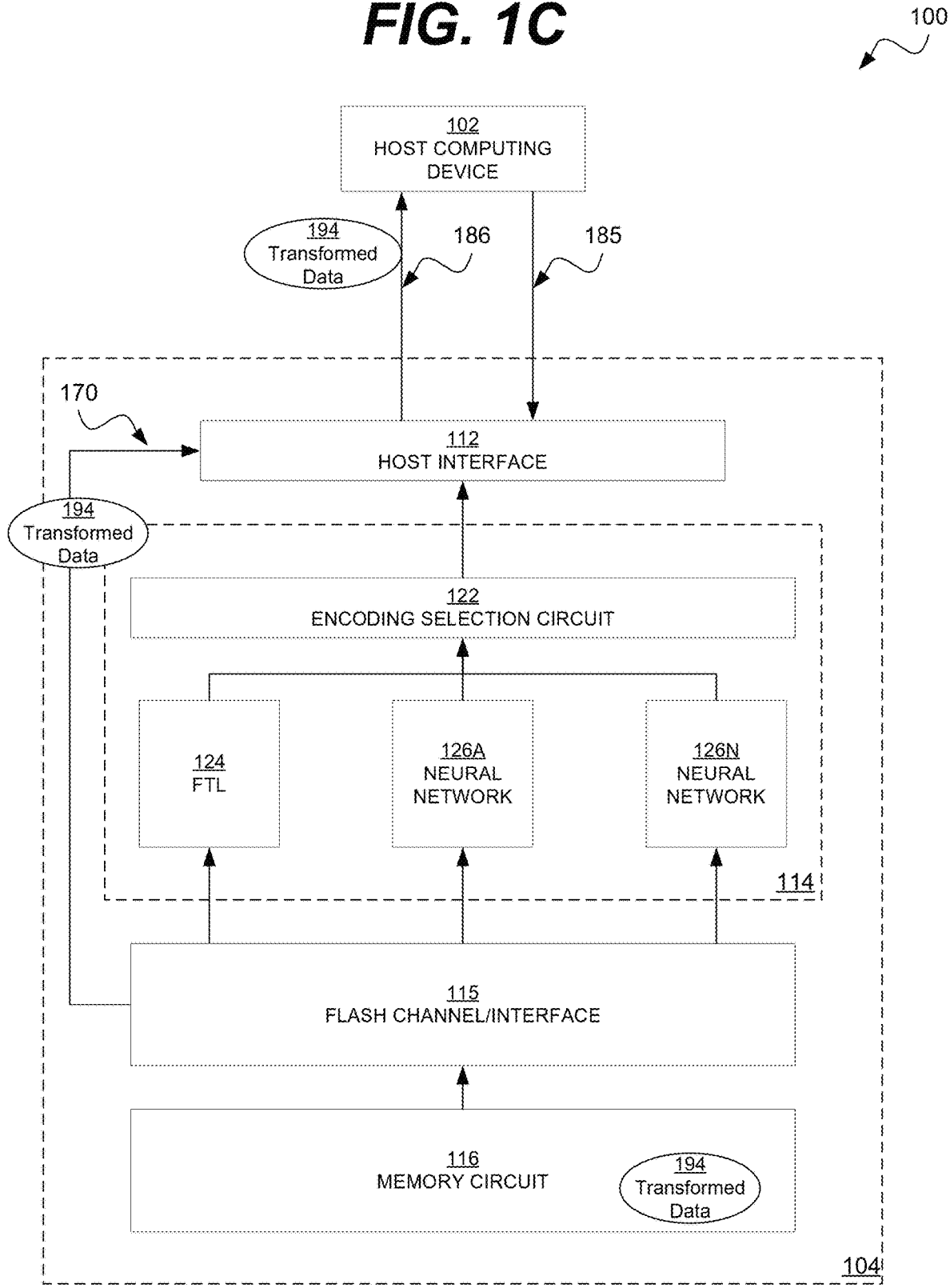
FIG. 1C is a block diagram of an example embodiment of a system in accordance with the disclosed subject matter.

FIG. 1C is a block diagram of an example embodiment of a system 100 in accordance with the disclosed subject matter. In various embodiments, the system 100 may be employed to store a large amount of data, as described above. In the illustrated embodiment, a read memory access is illustrated.

In the illustrated embodiment, the system 100 may again include the host computing device 102 and the storage device 104. In such an embodiment, the storage device 104 may include the host interface circuit 112, the translation circuit 114, and the memory circuit 116.

In the illustrated embodiment, the translation circuit 114 may include one or more ML circuits 126, configured to decode or recreate the original data set (or a facsimile or likeness thereof), known as the reconstructed data set 196. In various embodiments, in which a plurality of ML circuits 126 (e.g., NNs 126A and 126N) and/or the FTL 124 are included, the translation circuit 114 may include an encoding (or decoding) selection circuit 122.

In the illustrated embodiment, the host computing device 102 may issue a read memory access or request 185. The read request 185 may be associated with the original data set (shown in FIG. 1A). In such an embodiment, the read request 185 may include a logical address or a key (of a key-value pair) to indicate what data set is being requested.

However, in the illustrated embodiment, the read request 185 may not ask for or expect the reconstructed data set to be returned. Instead, the read request 185 may ask for the transformed data set 194, itself.

In such an embodiment, the storage device 104 may include a path 170 that bypasses the translation circuit 114 or at least the ML circuits 126. In various embodiments, the path 170 may utilize the FTL 124, instead of that shown in FIG. 1C. It is understood that the above is merely one illustrative example to which the disclosed subject matter is not limited.

In such an embodiment, the storage device 104 may determine which transformed data set 194 is being requested, and directly supply the transformed data set 194 to the host computing device (via read response 186). In such an embodiment, the amount of data transmitted between the storage device 104 and the host computing device 102 may be dramatically reduced.

In one embodiment, the host computing device 102 may include a ML circuit similar to the ML circuit 126 that encoded the transformed data set 194. In such an embodiment, the host computing device 102 may be able to create the reconstructed data set locally (to the host 102). In such an embodiment, the storage device 104 and host device 102 may be able to transfer ML circuit 126 weights or settings, such that the ML circuits may stay synchronized.

Figure 2:
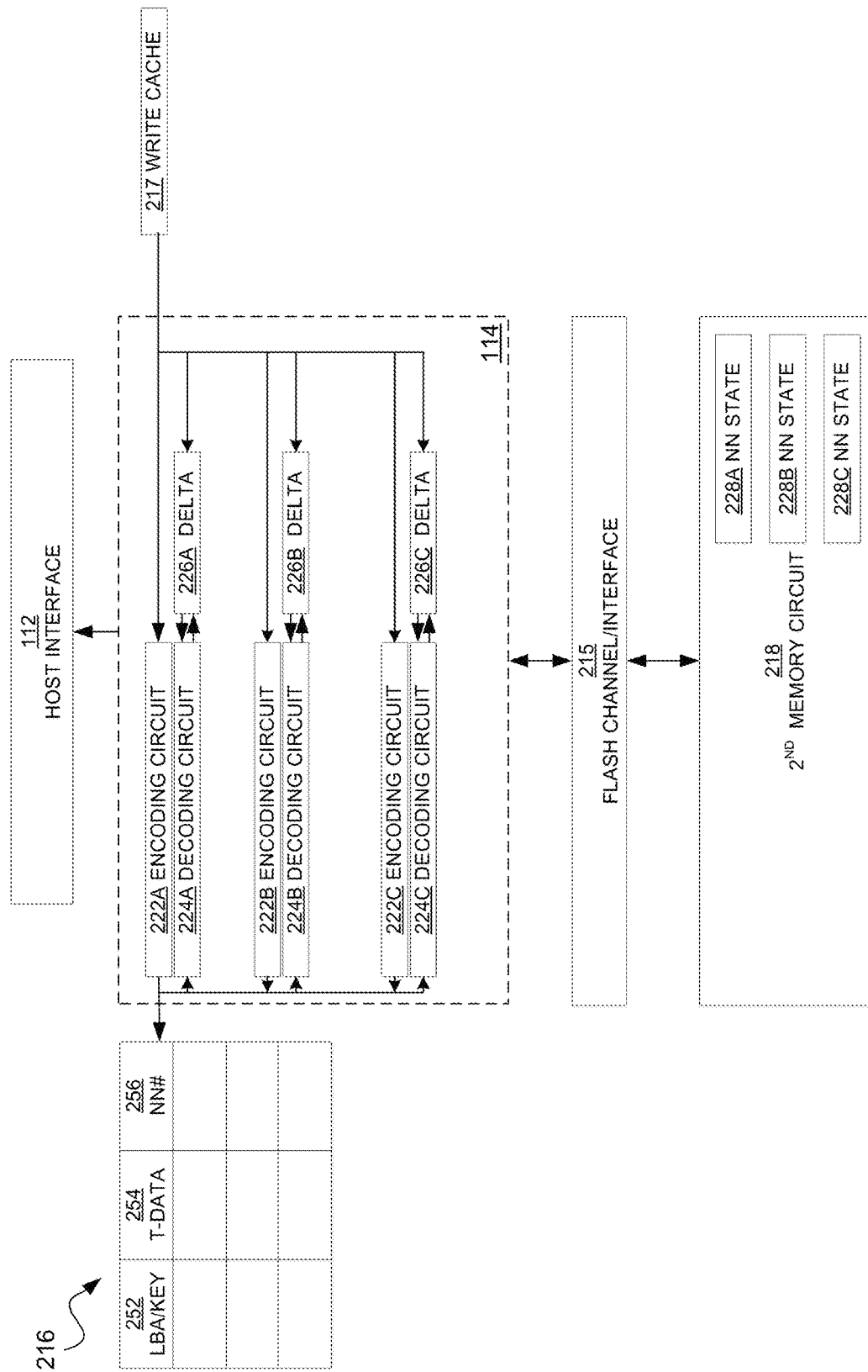
FIG. 2 is a block diagram of an example embodiment of a system in accordance with the disclosed subject matter.

FIG. 2 is a block diagram of an example embodiment of a system 200 in accordance with the disclosed subject matter. In the illustrated embodiment, the system 200 may include the storage device of FIG. 1A.

In the illustrated embodiment, the system 200 may include a host interface circuit 112, as described above. In such an embodiment, the host interface circuit 112 may be configured to transmit and receive data to/from an external computing device (not shown).

In the illustrated embodiment, the system 200 may include a translation circuit 114, as described above. In such an embodiment, the translation circuit 114 may include one or more machine learning (ML) circuits.

In the illustrated embodiment, each ML circuit may include an encoding circuit 222 (e.g., encoding circuits 222A, 222B, and 222C). The encoding circuit 222 may be configured to transform an original data set to the transformed data, as described above.

In the illustrated embodiment, each ML circuit may include a decoding circuit 224 (e.g., decoding circuits 224A, 224B, and 224C). The decoding circuit 224 may be configured to transform the transformed data set to the reconstructed data, as described above.

In various embodiments, the translation circuit 114 may include a single encoding circuit 222 and multiple decoding circuits 224. In such an embodiment, the translation circuit 114 may select which decoding circuit 224 produces the least difference or highest fidelity. It is understood that the above are merely a few illustrative examples to which the disclosed subject matter is not limited.

In the illustrated embodiment, each ML circuit may include a difference or delta circuit 226 (e.g., difference circuits 226A, 226B, and 226C). In various embodiments, the translation circuit 114 may include one difference or delta circuit 226 or multiple ML circuits may share a difference or delta circuit 226. In such an embodiment, the difference circuit 226 may be configured to compare the original data set to the reconstructed data set. In such an embodiment, the difference circuit 226 may indicate or compute the level or amount of fidelity provided for a respective ML circuit. As described above, the translation circuit 114 may make use of this fidelity level when determining which ML circuit to use to encode the original data set. In another embodiment, the observed delta can be used to update the weights and other such parameters of the neural networks used in encoder and/or decoder circuits to achieve the desired reconstruction fidelity. That is to say that during data write operation, the observed reconstruction delta can be used to train the neural networks so that the input data can be later reconstructed to the desired level of accuracy. In some embodiments the neural networks are pre-trained and only the number of layers of the networks are varied to achieve the desired reconstruction fidelity.

In various embodiments, the system 200 may include a write cache 217. The write cache 217 may be configured to provide temporary storage. In various embodiments, this temporary storage may be for the original data set and/or any intermediate values during the encoding/decoding procedures of the ML circuit.

In various embodiments, the system 200 may include a memory circuit 216, as described above. In various embodiments, the memory circuit 216 may store the transformed data sets. The memory circuit 216 may also store the desired fidelity level, which can be used during reconstruction of the data.

In the illustrated embodiment, the memory circuit 216 may be organized into a data structure, such as a look-up table, indexed array, or series of fields. In the illustrated embodiment, the memory circuit 216 may include an indexing field 252 that allows the system 200 to find the transformed data set. In various embodiments, the indexing field 252 may include the logical block address (LBA) or the key of a key-value (KV) pair.

The memory circuit 216 may include a data field 254 that stores the transformed data set, or a pointer to the transformed data set. In such an embodiment, because identical instances of the original data set may result in the same transformed data set the system 200 may perform data de-duplication, and therefore save additional space.

In one embodiment, the memory circuit 216 may store the transformed data set 194 in the data field 254. We refer to the transformed data set 194 that is stored in data field 254 as the Deep-Key. In such embodiment, the transformed data set 194, i.e., the Deep-Key, may or may not be stored in the second memory circuit 218 separately. The first memory circuit 216 including the Deep-Key is stored persistently into the second memory circuit 218.

The memory circuit 216 may include an encoding field 256 that stores and identifies which ML circuit encoded and/or will be used to decode the transformed data set. In such an embodiment, the translation circuit 114 may be able to quickly determine which ML circuit should be used of the deciding process.

In the illustrated embodiment, the system 200 may also include a second memory circuit 218 and a flash channel or interface circuit 215. In various embodiments, the first memory circuit 216 and second memory circuit 218 may be included in the same memory circuit, but within separate partitions or portions.

In various embodiments, the second memory circuit 218 may be configured to store the state or weight values of the various ML circuits (e.g., NN states 228A, 228B, and 228C). In such an embodiment, the translation circuit 114 may quickly and dynamically switch between ML circuits or configurations of the ML circuits. In various embodiments, the translation circuit 114 may include a device processor or controller that is configured to switch between ML circuits by loading different ML states 228 or settings.

As described above, the system 200 may include the following aspects or advantages. In the illustrated embodiment, the system 200 may employ a neural network as a storage medium rather than storing the data "as-is" on the memory circuit. The system 200 may significantly increase the storage capacity compared to traditional storage devices. In various embodiments, certain operations (e.g., searches) may be performed by neural networks and/or machine learning circuit rather than performing the operation on the entire data, leading to faster data operations. For example, a machine learning circuit may transform data from a first format to a second format. In turn, the machine learning circuit may perform one or more searches on the data in the second format without transforming the data into the first format.

In various embodiments, the system 200 may automatically de-duplicate the stored data. In such an embodiment, de-duplication may be at the block level or some granularity of data chunks, leading to more de-duplication of data.

In some embodiments, the host may specify varying degrees of fidelity for storing the data. If fidelity is 100%, the data (whether stored losslessly or directly) may be returned "as-is" to the host. If fidelity is less than 100%, the data returned to host will be an approximation of the original data that may or may not be of the original data size. That is to say that in some embodiments, the returned data may have the exact same size of the original data, however the returned data values may not match exactly with the original data values.

In such an embodiment, the system 200 may complement machine learning applications. In various embodiments, machine learning applications may not need reconstructed data; but rather can use the reduced feature representation. For example, the transformed data set may be used directly to speed-up the ML applications.

Figure 3:
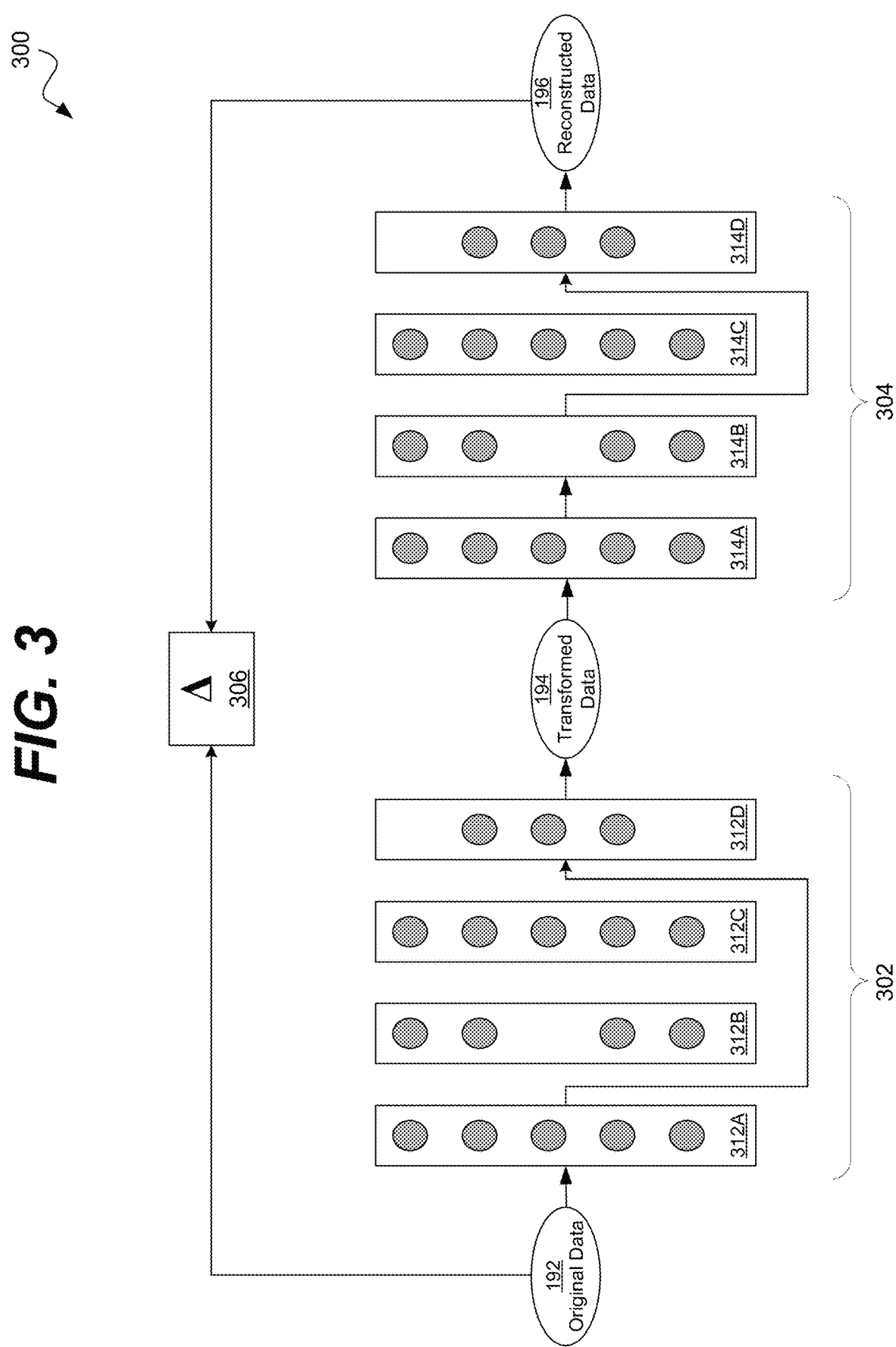
FIG. 3 is a block diagram of an example embodiment of a system in accordance with the disclosed subject matter.

FIG. 3 is a block diagram of an example embodiment of a system 300 in accordance with the disclosed subject matter. In various embodiments, the system 300 may include a machine learning (ML) circuit or software implementation. In one specific embodiment, the system 300 may include a neural network.

In the illustrated embodiment, the system 300 may include an encoder neural network 302 and a decoder neural network 304. In various embodiments, the neural networks 302 and 304 may each include a plurality of layers (e.g., layers 312A, 312B, 312C, 312D and 314A, 314B, 314C, & 314D). Each layer 312/314 may include various weights and number of neurons that process the input of the layer to produce an output. Each layer in a neural network may be of different type and may include different neural network nodes, operations, and layers such as convolutions, dense connections between two layers, recurrent neural network units, long short term memory units, gated recurrent units, generative adversarial networks, sigmoid, softmax, etc. It is understood that these are merely illustrative examples to which the disclosed subject matter is not limited. The output is then used as the input to another layer, until the final output layer (e.g., 312D or 314D) of the neural network is reached.

In the illustrated embodiment, the original data set 192 may be input into the encoding neural network 302 to produce the transformed data set 194. Likewise, the transformed data set 194 may be input into the decoding neural network 304 to produce the reconstructed data set 196.

In such an embodiment, the system 300 may include a difference or delta circuit 306. The delta circuit 306 may compare the original data set 192 to the reconstructed data set 196 and determine how accurately the neural networks 302 and 304 have reproduced the original data set 192. In various embodiments, this accuracy may be compared to the fidelity requirement, as described above.

In various embodiments, the system 300 may be configured to dynamically adjust the accuracy of the system 300 by skipping or bypassing various layers within the neural networks 302 and 304. For example, in one embodiment, if the fidelity is higher than required, the system 300 may bypass the layer 312B. If the fidelity is still higher than required, the system 300 may bypass both layers 312B and 312C. Likewise, layers in the decoding neural network 304 may be skipped (e.g., layer 314C). Conversely, if the achieved fidelity is lower than the required level, previously bypassed layers may be re-added to the computation to increase the fidelity level.

In various embodiments, the layers may be added/bypassed simultaneously within the encoding and decoding neural networks 302 & 304. In another embodiment, the layers may be added/bypassed independently.

In various embodiments, the system 300 may include or be constrained by various settings. For example, the system 300 may be limited by a maximum number of layers it may skip or bypass. In another embodiment, the system 300 may be limited by a maximum number of times or attempts that may be made to achieve the desired fidelity requirement (or other requirements, such as, computation time, etc.). It is understood that the above are merely a few illustrative examples to which the disclosed subject matter is not limited.

In various embodiments, the system 300 may make this fidelity calculation as part of the data storage operation. In such an embodiment, the system 300 determines what neural network settings to employ to achieve the desired fidelity or other resource requirements. In such an embodiment, the settings for the neural network may be stored along with which neural network was employed to encode the data.

In various embodiments, if the system 300 is unable to achieve the desired fidelity within a set number of tries or at all, the system 300 may use a setting that achieves a fidelity level as close as possible to the fidelity requirement. In another embodiment, if the system 300 is unable to achieve the fidelity desired, the system 300 may store the original data set 192 "as-is" or in its original state (e.g., via the FTL). In another embodiment if the system 300 is unable to achieve the exact fidelity desired, the system 300 may store the original data at a fidelity level that may be higher than the desired fidelity level but less than 100% fidelity level. In yet another embodiment, if the system 300 is unable to achieve the desired fidelity (or other requirement), the system 300 may switch to another one of the plurality of ML circuits and try again. It is understood that the above are merely a few illustrative examples to which the disclosed subject matter is not limited.

Figure 4:
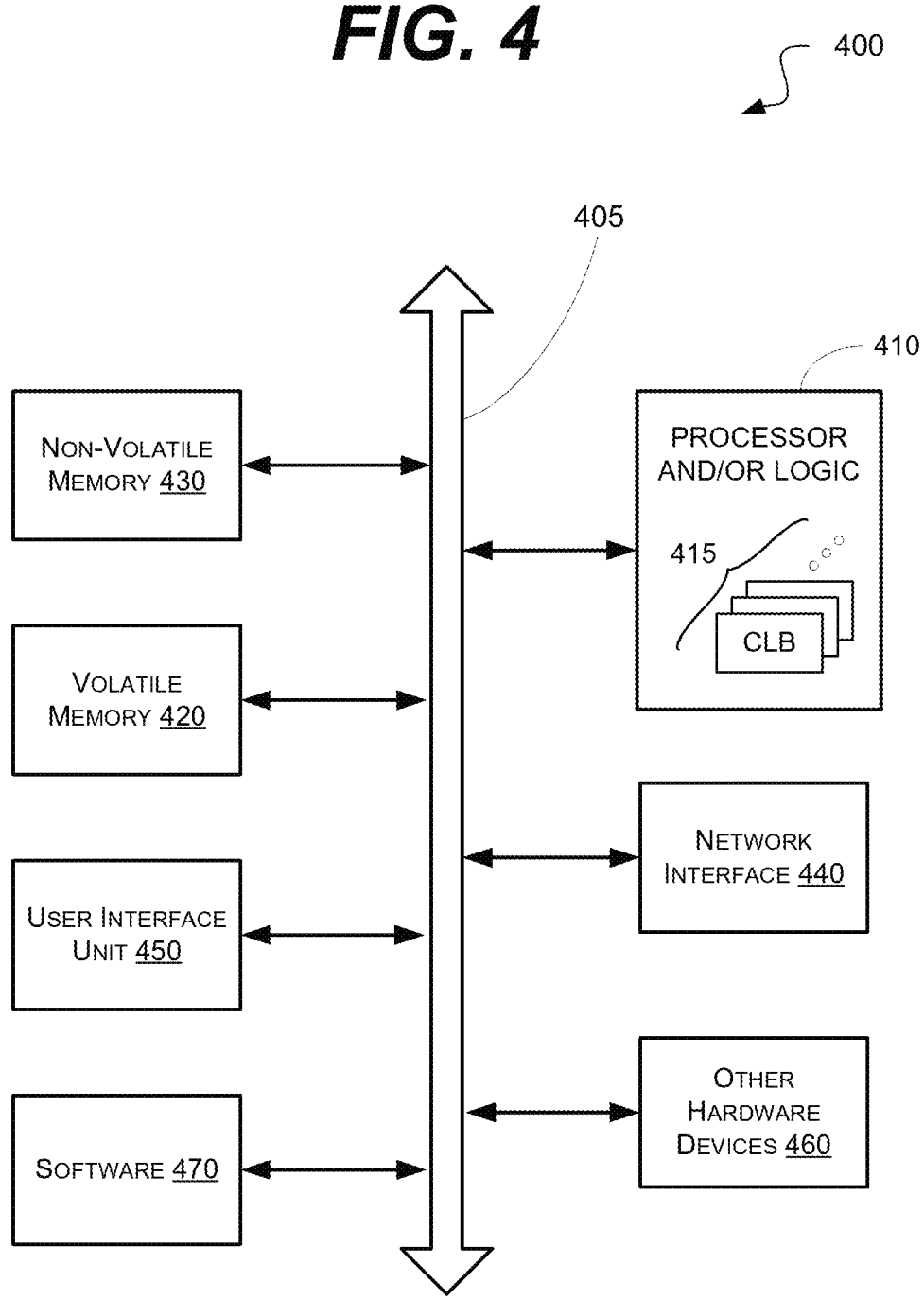
FIG. 4 is a schematic block diagram of an information processing system that may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM)). The information processing system 400 according to the disclosed subject matter may further include a non-volatile memory 430 (e.g., a hard drive, an optical memory, a NAND or Flash memory). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 400 according to the disclosed subject matter may further include a user interface unit 450 (e.g., a display adapter, a haptic interface, a human interface device). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440) of the information processing system 400. In such an embodiment, the information processing system 400 may include one or more native applications, which may be installed locally (e.g., within the non-volatile memory 430) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts is to be determined by the broadest permissible interpretation of the following claims and their equivalents and should not be restricted or limited by the foregoing description. It is, therefore, to be understood that the appended claims are intended to cover all such modifications and changes as fall within the scope of the embodiments.

What is claimed is:

1. An apparatus comprising:
    a host interface circuit configured to receive a memory access request, wherein the memory access request is associated with a data set;
    at least one non-volatile memory storage circuit configured to store a transformed data set; and
    a translation circuit comprising a machine learning circuit and configured to:
        based on a write memory access, convert an original version of the data set to the transformed data set, and
        based on a read memory access, convert the transformed data set to a reconstructed data set that includes an approximation of the data set that differs from the data set;
    wherein the at least one non-volatile memory storage circuit is configured to store a persistent state of the machine learning circuit used to convert the original version of the data set to the transformed data set; and
    wherein the persistent state of the machine learning circuit comprises a configuration to convert the transformed data set to the reconstructed data set.

2. The apparatus of claim 1, wherein the machine learning circuit comprises a first machine learning circuit, and wherein the translation circuit comprises a second machine learning circuit, and
    wherein the translation circuit is configured to select one of the first or second machine learning circuits to convert the data set based, at least in part, upon an amount of fidelity specified by the host and the amount of fidelity provided by the machine learning circuit.

3. The apparatus of claim 2, wherein the fidelity specified by the host is a fixed value for a set of storage parameters, wherein the set of storage parameters comprise one or more of:
    namespace identifier, host identifier, logical block address ranges, non-volatile memory set identifier, non-volatile memory express submission queue identifier, stream identifier, Ethernet media access control identifier, network addresses, transport parameter, date, or time.

4. The apparatus of claim 2, wherein the specified fidelity is adjustable;
    wherein the specified fidelity is adjusted based, at least in part, upon a data type associated with the memory access request; and
    wherein the specified fidelity is adjusted based, at least in part, upon a software application associated with the memory access request.

5. The apparatus of claim 1, wherein the transformed data set has a size smaller than or equal to the original version of the data set; and wherein the reconstructed data set is different than the original version of the data set.

6. The apparatus of claim 1, wherein the translation circuit is configured to de-duplicate the data set, and wherein de-duplication of the data is performed at a block level.

7. The apparatus of claim 1, wherein, based on a read memory access, the host interface is configured to return the transformed data set, wherein the transformed data set is smaller than or the same size as the original version of the data set, and the transformed data set is an approximation of the data set.

8. The apparatus of claim 1, wherein the at least one non-volatile memory storage circuit comprises:
    a first field that associates an addressing value included in the memory access with the transformed data set, and a second field that indicates the machine learning circuit used to create the transformed data set.

9. The apparatus of claim 1, wherein the translation circuit includes a flash translation layer circuit configured to create a version of the transformed data set that is equal to the original version of the data set, and create a reconstructed data set that is equal to the original version of the data set; and
    wherein the translation circuit is configured to, based upon a fidelity requirement, use the machine learning circuit to process the transformed data set.

10. The apparatus of claim 1, wherein the machine learning circuit includes a neural network; and
    wherein the translation circuit is configured to adjust a number of layers in the neural network based, at least in part, upon a fidelity requirement.

11. The apparatus of claim 1, wherein the machine learning circuit comprises a first machine learning circuit, the translation circuit comprises a second machine learning circuit, and the translation circuit is configured to:
    use an observed reconstruction delta to train the first machine learning circuit, and use the observed reconstruction delta to determine a fidelity based on using the first machine learning circuit; and select the first machine learning circuit based on the fidelity.

12. The apparatus of claim 1, wherein the machine learning circuit includes an encoder neural network and two or more decoder neural networks.

13. The apparatus of claim 1, wherein the translation circuit is configured to determine to perform a lossy conversion of the original version of the data set to the transformed data set based, at least in part, upon a fidelity target; and
wherein the translation circuit is configured to adjust an amount of loss based, at least in part, upon a fidelity target.

14. A system comprising:
a host computing device configured to perform a write memory access and a read memory access with a storage device, wherein the write memory access and the read memory access are associated with a data set;
the storage device comprising:
at least one memory storage circuit configured to store a transformed data set; and
a translation circuit comprising a machine learning circuit and configured to:
based on the write memory access, convert an original version of the data set to the transformed data set, and
based on the read memory access, convert the transformed data set to a reconstructed data set that includes an approximation of the data set that differs from the data set;
wherein the at least one memory storage circuit is configured to store a persistent state of the machine learning circuit used to convert the original version of the data set to the transformed data set; and
wherein the persistent state of the machine learning circuit comprises a configuration to convert the transformed data set to the reconstructed data set.

15. The system of claim 14,
wherein the machine learning circuit comprises a first machine learning circuit, the translation circuit comprises a second machine learning circuit, and wherein the translation circuit is configured to select one of the first or second machine learning circuits to convert the data set based, at least in part, upon an amount of fidelity provided by the selected machine learning circuit; and
wherein the transformed data set has a size smaller than the original version of the data set.

16. The system of claim 14, wherein the machine learning circuit comprises a first machine learning circuit, wherein the translation circuit comprises a second machine learning circuit, and wherein, based on a read memory access, the storage device is configured to return to the host computing device the transformed data set, wherein the transformed data set is smaller in size than the original version of the data set;

wherein the translation circuit includes a direct storage circuit configured to create a version of the transformed data set that is equal to the original version of the data set, and create a reconstructed data set that is equal to the original version of the data set; and
wherein the translation circuit is configured to select, based upon a fidelity requirement, one of the first or second machine learning circuits to process the transformed data set.

17. The system of claim 14, wherein the at least one memory storage circuit comprises:
a field that associates an addressing value included in the memory access with the transformed data set, and a field that indicates the machine learning circuit used to create the transformed data set.

18. The system of claim 14, wherein the machine learning circuit includes one or more neural networks; and
wherein the translation circuit is configured to adjust the number of layers in the neural networks based, at least in part, upon a fidelity requirement.

19. A method comprising:
receiving an original data set to store in at least one memory circuit;
converting the original data set, via a machine learning technique, to a transformed data set, wherein the transformed data set is smaller than the original data set and wherein a reconstructed data set created from the transformed data set includes an approximation of the data set that differs from the data set;
storing the transformed data set in the at least one memory circuit; and
storing a persistent state of the machine learning technique used to convert the original data set to the transformed data set in the at least one memory circuit;
wherein the persistent state of the machine learning technique comprises a configuration to create the reconstructed data set from the transformed data set.

20. The method of claim 19, further comprising:
receiving a request, from a host device, to retrieve the original data set from the at least one memory circuit;
retrieving the transformed data set from the at least one memory circuit;
retrieving the persistent state of the machine learning technique from the at least one memory circuit;
converting, via the machine learning technique, the transformed data set to the reconstructed data set; and
returning, to the host device, the reconstructed data set.

21. The method of claim 19, wherein storing the transformed data set includes storing the transformed data set in a data field of an address translation table; and
the method further comprising performing a search using the machine learning technique.

* * * * *